INVENTORS
EUGENE W. HINES,
TIMOTHY McGRATH,
JAMES E. LORENZ,
JAMES A. HERMAN,

BY Pierce, Scheffler & Parker
their ATTORNEYS 3,516,777
APPARATUS FOR SUPPLYING MIXTURE OF
BURNABLE FLUID WASTE MATERIAL AND
AIR TO INCINERATOR BURNER
Eugene W. Hines, Saline, Timothy McGrath, Detroit, James E. Lorenz, Livonia, and James A. Herman, Royal Oak, Mich., assignors to Prenco Manufacturing Company, Royal Oak, Mich., a corporation of Michigan
Filed July 26, 1968, Ser. No. 748,085
Int. Cl. F23d 13/40
U.S. Cl. 431—354
2 Claims

ABSTRACT OF THE DISCLOSURE

Combustible fluid waste, which may or may not contain particulate solid material suspended therein, is forced as a stream through an aerating device, so as to entrain therein a substantial amount of air, in the form of fine bubbles, and the resulting frothy mass is forced to and through a burner nozzle of an incinerator.

This invention relates to the art of incinerating fluid waste materials, and is concerned with expediting the combustion of such fluid waste material by reason of the predispersion of the fluid in air. The invention is an improved step in the process disclosed in U.S. Pat. No. 3,357,375, John W. Brophy, and reference is made to said patent for a full disclosure of patentee's process of incinerating fluent waste materials.

According to the present invention, a stream of fluid waste is passed through a chamber wherein the fluid is aerated with a large amount of air, whereby the fluid stream is converted into a frothy mass of intimately mixed air and fluid, and the frothy mass is forced to and through a nozzle of a burner in an incinerator. At the burner the frothy mass is further mingled with combustion air and thereupon combusted in a combustion space (of such incinerator) contiguous with such burner. By reason of the thorough-going dispersion of air in the aforesaid frothy mass the latter very promptly burns upon ignition and ensures the complete destruction of the fluid waste in a minimum combustion time.

The aeration chamber may be an eductor, of the general sort disclosed in U.S. patent application Ser. No. 748,105 filed July 26, 1968 on behalf of Eugene W. Hines, one of the present applicants, or it may be an aerator integrated into or with the delivery tube of the burner nozzle itself. In either event, air in the form of a myriad of fine bubbles is forced into the stream of fluid waste and is homogeneously distributed through the fluid stream.

Figure 1:
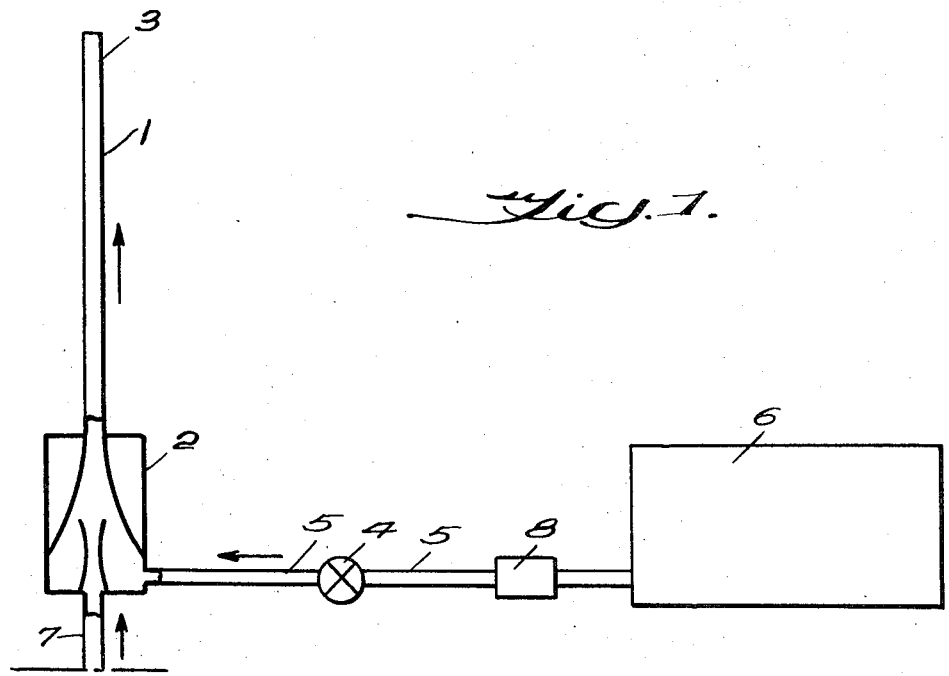

The invention will now be described in greater detail and with reference to the appended drawing, in which FIG. 1 is a diagrammatic representation of an assembly of apparatus parts for delivering fluid waste to an incinerator burner nozzle, of the type disclosed in the aforesaid Brophy Pat. No. 3,357,375, the apparatus including an eductor as the aerating chamber, and FIG. 2 diagrammatically represents an apparatus similar to that illustrated in FIG. 1 except for the substitution of a different aerating means for the eductor of FIG. 1.

In FIG. 1, it will be seen that oily waste or other waste fluid flows from tank 6 through conduit 5, being metered at valve 4, and then making entry into eductor 2. Fluid waste is sucked into the eductor by reason of the principles involved in the operation of any eductor or ejector. The motive fluid to produce this suction and pumping action is high pressure blower air (or compressed air), the high pressure blower air flowing through conduit 7 from a source (not shown) and becoming intimately associated with the fluid waste material being sucked into the eductor. The resultant mixture flows through nozzle pipe 1 as foamy mass of intimately associated air and fluid, emerging at an incinerator burner nozzle 3 in a condition highly suited for immediate ignition and burning.

Figure 2:
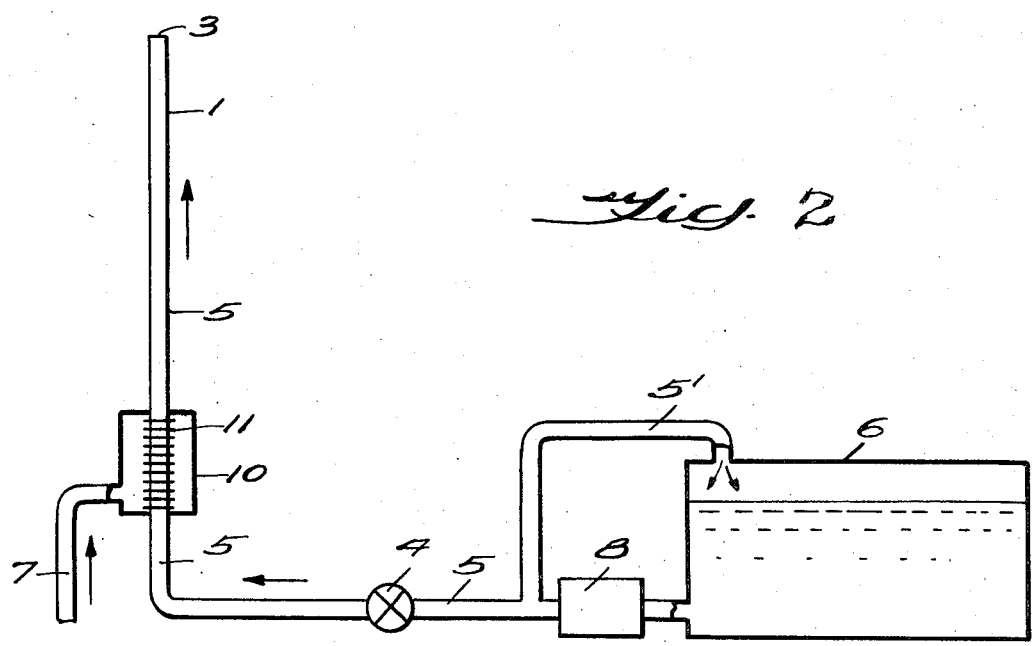

In FIG. 2, a branch conduit 5', has been interposed in conduit 5 between pump 8 and metering valve 4. In this arrangement, the overflow (refused by metering valve 4) is returned by branch conduit 5' to tank 6. Instead of an eductor, there is used as aerating device an assembly consisting of a chamber 10 through which there extends an aerating tube 11, which is interposed in conduit 5. Air under pressure is delivered through air inlet conduit 7 into chamber 10. In its passage through aerating tube 11 the stream of fluid waste is injected with a myriad of fine bubbles of air from the compressed air mass filling chamber 10, thereby providing the aforesaid foaming mass of aerated fluid waste.

The invention can be further explained by recourse to one specific installation wherein the material to be delivered in froth form to the burner is an oil type waste material having a specific gravity of approximately 40° A.P.I. at 60° F. As this oil flows to the air lift pump of FIG. 2, air makes entry into the oil through the multiplicity of holes in the center tube; the greater the number of holes provided for the entrance of air into the oil, the more bubbles per unit volume of the mixture of oil and air. The density of the oil after air enters it is decreased by as much as 80%. This, of course, is the function of the air pressure. The efficiency of the increase or decrease in the density of the waste product depends on the particular viscosity of the waste itself. However, using the example of oil, as given, there results a decrease in density by approximately 80%. The air pressure for starting purposes must slightly exceed the oil pressure in the tube at start-up. We have found that 20 inches W.C. produces pumping at a steady flow.

It has been found that the total area of the air holes should be equal to the area of the inside diameter of the oil tube section.

We claim:
1. Apparatus for delivering an air-waste fluid froth to an incinerator burner, which comprises
   a container source of waste fluid to be burned;
   a diffuser means for introducing air in the form of fine bubbles into a stream of waste fluid;
   an air inlet conduit delivering air under pressure to said diffuser means;
   a first conduit for waste fluid communicating between said container source and said diffuser means, said conduit including
   pump means for passing waste fluid from said container source to said diffuser means;
   a metering valve in said first conduit between said pump means and said diffuser means;
   an incinerator burner having a nozzle; and
   a second conduit communicating between said diffuser means and said burner nozzle for delivering air-waste fluid froth from said diffuser means to said nozzle, said diffuser means consisting essentially in the combination of a compressed air chamber, into which said air inlet conduit extends, and a diffuser tube which extends through said chamber and communicates between said first conduit and said second conduit, said diffuser tube having therein a multiplicity of fine apertures through which air can be pressed into a stream of fluid waste being passed through said tube.

2. The apparatus defined in claim 1, in which a branch conduit communicates between (a) that portion of said first conduit which extends between said pump means and said metering valve and (b) said container source of waste fluid.

References Cited
UNITED STATES PATENTS

| | | | |
|---|---|---|---|
| 2,185,459 | 1/1940 | Hardgrove | 241—60 |
| 3,229,651 | 1/1966 | Wasp | 110—7 |
| 3,357,375 | 12/1967 | Brophy. | |

FREDERICK L. MATTESON, JR., Primary Examiner

R. A. DUA, Assistant Examiner

U.S. Cl. X.R.

110—7